United States Patent [19]

Vassiliades et al.

[11] 3,919,110

[45] *Nov. 11, 1975

[54] COLORED ORGANIC SYNTHETIC PIGMENTS AND METHOD FOR PRODUCING SAME

[75] Inventors: Anthony E. Vassiliades, Deerfield; Edward F. Nauman, Schaumberg, both of Ill.; Shrenik Shroff, Bombay, India

[73] Assignee: Champion International Corporation, New York, N.Y.

[ * ] Notice: The portion of the term of this patent subsequent to June 13, 1989, has been disclaimed.

[22] Filed: Nov. 8, 1972

[21] Appl. No.: 304,646

Related U.S. Application Data

[63] Continuation-in-part of Ser. No. 87,654, Nov. 6, 1970, Pat. No. 3,707,514, which is a continuation-in-part of Ser. No. 786,337, Dec. 23, 1968, Pat. No. 3,585,149.

[52] U.S. Cl. .............. 252/316; 8/79; 106/288 Q; 106/307; 106/308 C; 106/308 M; 106/308 P; 106/308 Q; 106/312; 117/100 A; 117/100 B; 260/2.5 AK; 260/2.5 F
[51] Int. Cl.².... B01J 13/02; C08J 9/00; C09C 1/00
[58] Field of Search .............. 252/316, 62.1 P; 117/100 A; 264/4; 260/2.5 F, 2.5 AK; 106/312, 288 Q, 307, 308 C, 308 M, 308 P, 308 Q; 8/79

[56] References Cited
UNITED STATES PATENTS

| | | | |
|---|---|---|---|
| 3,016,308 | 1/1962 | Macaulay | 252/316 X |
| 3,462,283 | 8/1969 | Hjermstad et al. | 117/100 A X |
| 3,502,582 | 3/1970 | Clemens et al | 252/62.1 |
| 3,669,899 | 6/1972 | Vassiliades et al. | 252/316 |

*Primary Examiner*—Richard D. Lovering
*Attorney, Agent, or Firm*—Roylance, Abrams, Berdo & Kaul

[57] ABSTRACT

Colored, synthetic, organic pigments are provided which comprise discrete, substantially spherical, air-containing microcapsules having an average particle diameter below about two microns and substantially continuous solid walls with a dye material incorporated in the wall or an oil-dispersible pigment provided in the core of the microcapsule. Such colored pigments are produced by providing an oil-soluble dye or oil-dispersible pigment in the oily phase of the emulsion that is employed to provide oil-containing microcapsules which are activated by heating to drive the oil from said microcapsules and replace it by air to provide air-containing pigments. Alternatively, a water-soluble dye may be incorporated in an aqueous dispersion of the oil-containing microcapsules.

20 Claims, No Drawings

3,919,110

COLORED ORGANIC SYNTHETIC PIGMENTS AND METHOD FOR PRODUCING SAME

This application is a continuation-in-part of U.S. Application Ser. No. 87,654 filed Nov. 6, 1970, now U.S. Pat. No. 3,707,514 which, in turn is a continuation-in-part of U.S. Application Ser. No. 786,337 filed Dec. 23, 1968, now U.S. Pat. No. 3,585,149, both in the name of A. E. Vassiliades, E. F. Nauman and Shrenik Shroff filed Nov. 6, 1970.

This invention relates to the production of colored, organic, synthetic pigments. More particularly, this invention relates to microcapsular, colored pigments possessing unique, controllable properties including controlled color and shade.

U.S. Pat. No. 3,585,149 to A. E. Vassiliades et al entitled "Microcapsular Opacifier System", filed Dec. 23, 1968, and U.S. Pat. Application Ser. No. 87,654, now U.S. Pat. No. 3,707,514, to A. E. Vassiliades et al entitled "Novel Synthetic Organic Pigments, Method For Their Production And Systems Employing Same" describe opacifying agents comprising air-containing microcapsules having an average particle diameter below about one micron. These unique, small diameter opacifying agents provide highly opaque surfaces when coated onto and/or incorporated into fibrous and non-fibrous substrates. However, by virtue of the nature of the materials employed to make the microcapsular walls, the resulting air-containing microcapsules are white and yield surface coatings that are white.

It has been proposed to provide an emulsion paint by dissolving an organic dye in the internal phase of a liquid-in-solid dispersion. Thus, in the M.I.T. thesis entitled "An Investigation of Liquid-in-Solid Dispersions as Surface Coatings" by Arthur E. Wolters (1950), it is indicated that an emulsion paint could be provided by adding either pigments or oil-soluble organic dyes to the oily internal phase. However, it is extremely difficult to match colors in order to provide the desired shade employing such an expedient.

It has now been found that organic, synthetic pigment particles that are capable of imparting not only a controlled color to a given substrate, but additionally provide high gloss, high brightness, excellent adhesion, good printability, water and oil resistance, in addition to good opacity may be provided according to the present invention.

Surprisingly, it has been discovered that colored, synthetic microcapsular pigments may be provided which comprise discrete, substantially spherical, air-containing microcapsules having an average diameter below about two microns and having substantially continuous solid walls with a dye material incorporated in the wall of the capsule or an oil-dispersible pigment provided in the core of the capsule.

The organic pigments of the present invention may be employed either in a water dispersion or as a free flowing powder in a number of commercial usages including printing inks, decorative paper coatings, paints and the like.

According to one aspect of the present invention, oil-containing microcapsules having an average particle diameter below about two microns are provided with an organic or inorganic, colored pigment in the oily core of the microcapsule. This is accomplished by pre-dispersing a colored pigment in the oil phase of an emulsion that is employed to produce precursor microcapsules, i.e. oil-containing microcapsules which may be activated to provide air-containing colored pigments.

The organic or inorganic pigment which is employed is oil-dispersible. Thus, when the oil-containing precursor microcapsules are formed, all of the pigment that had been dispersed in the oil phase of the oil-in-water emulsion later becomes encased in the oily core of the precursor microcapsules. Following formation of the precursor microcapsules, the microcapsules are activated by driving the oil from the core of the capsule. As will be hereinafter discussed, this may be accomplished, for example, by spray-drying the capsules to volatilize the oil, or by coating the capsules onto a substrate, such as paper, and heating the resultant substrate to drive out the volatile oil through the micropores of the capsule wall.

With the proper selection of oil-dispersible pigments, it is possible to produce air-containing microcapsular opacifiers possessing any desired color and/or shade.

According to another aspect of the invention, colored, air-containing microcapsular pigments are produced by providing a dye as an integral part of the air-containing microcapsular wall or shell. According to this aspect of the invention, water-soluble dyes may be reacted with the capsular wall material either prior to or after the formation of the microcapsules. Thus, the water-soluble dye may be mixed with the oil-in-water emulsion employed to produce the precursor microcapsules which are thereafter activated to provide air-containing microcapsules.

In this manner the dye, which was present in the continuous or aqueous phase, reacts with and/or stains the wall of the microcapsule and thereby becomes an integral part of the air-containing microcapsule. Likewise, the water-soluble dye may be reacted with the microcapsules subsequent to the formation of the precursor microcapsule by introducing the dye into the aqueous dispersion of the microcapsules.

Regardless of the manner of incorporating the water-soluble dye in the microcapsule, after the precursor microcapsules are activated, an air-containing organic, colored pigment is provided wherein the dye is permanently attached to the capsular wall and, thus, it is not possible to leach out the color from the microcapsule upon further wetting of the surface thereof with water.

According to still another aspect of the invention, an oil-soluble dye, that is capable of reacting with and/or staining the capsular wall may be added to the oily phase of the emulsion prior to formation of precursor microcapsules. After the precursor microcapsules are activated to replace the oily core with air, colored, air-containing microcapsular pigments are formed. Such microcapsules are colored from the inside, and thus, they are protected by the wall of the microcapsules.

The microcapsules of the present invention provide distinct advantages over prior proposals including the provision of a dye or pigment dispersed in the liquid core of a microcapsule. In addition to the non-leachability of the present colored pigments, the shade of color and intensity thereof may be easily adjusted by the amount and type of dye or pigment employed.

In addition to the foregoing advantages, the colored, microcapsular pigments of the present invention need not be mixed with clays and/or adhesives as has been the case with conventional pigments and dyes. In addition, a higher level of pigments or dyes is required in prior systems to provide the same color intensity in a coating composition than is necessary to provide a colored coating having the same intensity employing the synthetic pigments of the present invention. Not only do the colored, microcapsular pigments of the present invention require no additional binder or adhesive to hold the dye or pigment to the particular substrate, but the present pigments need not be ball milled in order to provide a smooth, homogeneous, fine particle dispersion as is the case with conventional coatings. Still further, it is not necessary to employ expensive solvents and binders for printing operations when employing the colored microcapsular pigments of the present invention in printing inks.

Any suitable dyes may be used in the practice of the present invention. Oil soluble and water soluble dyes are well known in the art. For example, suitable water soluble dyes include Rhodamine B (Compound I in Table I below; bluish red with strong fluorescence; Color Index No. 45170), Tartrazine (II; yellow; described in JACS, 59 (1937) page 1501; Color Index No. 19140), Acid Yellow (III; reddish yellow; Color Index No. 18695), Acid Green (IV; green; Color Index No. 44025), Azure Blue (V; greenish blue; made by condensing o-formylbenzenesulfonic acid with α-(N-ethylanilino)-m-toluenesulfonic acid, oxidise and convert the product formed into the sodium salt; Color Index No. 42090), Basic Green I (VI; bright green; Color Index No. 42040). Likewise, suitable oil soluble dyes include, for example, Sudan Red (VII; red; Color Index No. 26105). Additional dyes include flushed alkali blue, Nubian resin black, calco oil blue ZA, nigrosive black and the like.

TABLE I

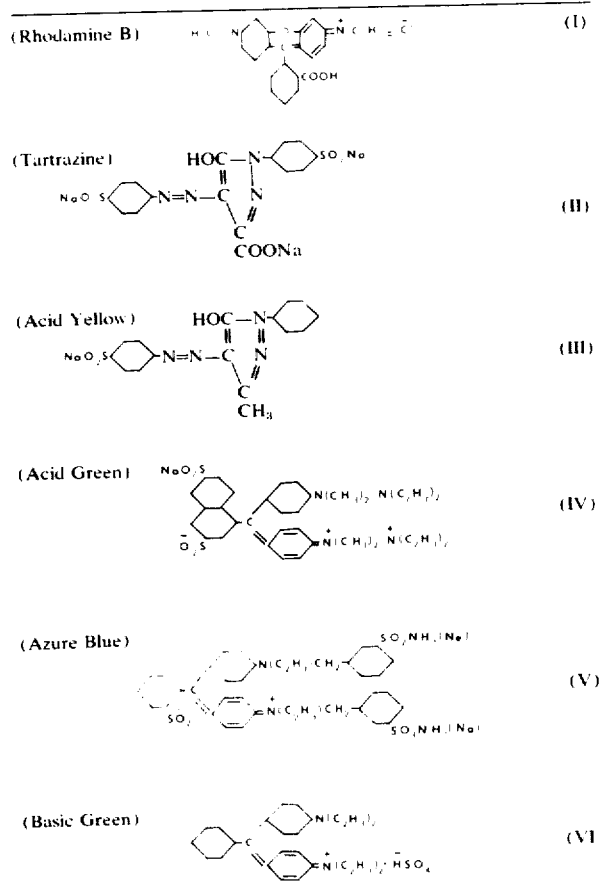

TABLE I-continued

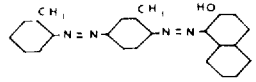

(Sudan Red) (VII)

Similarly, any suitable oil-dispersible pigment may be suitably employed in the practice of the present invention, which pigments are well known in the art. Suitable oil-dispersible pigments include pigments which are normally oil-dispersible, and those which may be employed in combination with a suitable surfactant, such as octyl phenol polyoxyethylene non-ionic surfactant for dispersing pigment, in order to render the pigment oil-dispersible. Thus, for example, carbon black, Indian red ($Fe_2O_3$), tuscan red, venetian red, red lead ($Pb_3O_4$), orange mineral, English vermillioin (HgS), American vermillion (chrome red, scarlet lead chromate which is a basic chromate of lead), phthalocyanine blue, Prussion blue ($Fe[Fe(CN)_6]_3$) being the approximate empirical formula, ultramarine, cobalt blue, phthalocyanine green, chrome green and chrome oxide green, the chrome yellows, yellow ochers and raw siennas, burnt sienna, raw umber, burnt umber and Vandyke brown, toluidene red, and other colored, i.e. non-white, oil dispersible pigments may be utilized.

The amount of dye or pigment that is incorporated into the microcapsule-forming emulsion will depend upon a number of factors including the nature of the dye or pigment, e.g., the tinting strength of the dye, as well as the nature of the oil and capsule wall material employed. Such concentrations may be easily determined experimentally. However, suitable amounts of the water soluble or oil soluble dyes include, for example, between about 0.1 and about 50 percent, preferably between about 0.5 and about 10 percent by weight of the solid capsular wall material. Similarly, the amount of oil dispersible pigment may be varied over a wide range depending upon the materials involved. Thus, between about 0.5 and about 300 grams of pigment per 100 grams of capsule core-forming oil, preferably between about 2 and about 100 grams of pigment per 100 grams of oil may be utilized.

Precursor microcapsules having substantially spherical, continuous, solid walls and containing minute droplets of an oily material may be provided by any suitable method. However, an especially preferred means of providing the precursor microcapsules of the present invention is by the simple admixture of:

A. an aqueous dispersion of a partially condensed, formaldehyde condensation product, said condensation product being capable of being separated from the aqueous phase in solid particle form upon dilution with water;

B. An oil-in-water emulsion comprising a water immiscible oily material as the dispersed phase and an aqueous, colloidal solution of a hydrophobic starch emulsifying agent as the dispersion medium The water of the emulsion is present in a quantity sufficient to cause the condensation product to precipitate about the dispersed droplets of oily material.

Upon admixture and under conditions of brisk agitation, the condensation product separates from the aqueous phase in solid particle form and encapsulates a nucleus of oil and water.

Further, the term "substantially continuous solid walls" is not intended to exclude micropores, which are necessary to permit escape of the volatile oily material. However, this term is intended to exclude cracks or fissures in the microcapsular walls, since this reduces the effectiveness of the microcapsular wall as a reflector and/or absorber of light.

As indicated above, the emulsifying agent of the present invention is preferably a hydrophobic starch. Although other emulsifying agents, such as the "amphiphilic" emulsifiers including naturally occurring, lyophilic colloids including gums, proteins and polysaccharides, such as, gum arabic, gum tragacanth, agar, gelatin and starch; and synthetic materials such as, hydroxyethyl cellulose, methyl cellulose, polyvinyl pyrrolidone, and copolymers of methyl vinyl ether and maleic anhydride, may be suitably employed.

The use of a hydrophobic starch as an emulsifying agent provides a multitude of desirable properties, including excellent barrier properties against oil, greases and wax; excellent wet rub resistance; resistance to solvents including mild alkalis and acids; excellent fold-crack resistance without the addition of plasticizers; good printability; and ease of coloring with relatively low cost dyestuffs.

Suitable etherifying agents, which react with ungelatinized granule starch in alkaline media to produce hydrophobic starch, include alkyl halides containing at least three carbon atoms, for example, alkyl chloride or bromide, and substituted alkyl halides such as methallyl chloride; aralkyl halides, for example, benzyl chloride or bromide, p-halo benzyl chloride or bromide, or 3-choro propenyl benzene; epoxy reagents, for example, phenyl glycidyl ether and allyl glycidyl ether.

The etherification reaction is conducted until the starch becomes hydrophobic and essentially non-gelatinizable. Finally, the starch is fragmented and reduced to submicronsized particles by treatment with steam under pressure. The starch is not swollen or cooked but is reduced to very fine particles which are mainly in the microscopic or colloidal size range. Such starches are described in U.S. 3,462,283 to Hjermstad et al the disclosure of which is hereby incorporated by reference.

The partially condensed formaldehyde condensation products which may be employed in the preferred precursor microcapsule-producing process of the present invention include resins not having reached the infusible or insoluble stage. Exemplary of suitable resins are the condensation reaction products of formaldehyde with phenols, such as, hydroxybenzene (phenol), m-cresol and 3,5-xylenol; carbamides, such as urea; triazines, such as melamine; amino and amido compounds, such as, aniline, p-toluenesulfonamide, ethyleneurea and guanidine. Under the influence of heat, these resins change irreversibly from a fusible and/or soluble material into an infusible and insoluble material.

The preferred formaldehyde condensation products are partially-condensed substituted and unsubstituted melamineformaldehyde, phenol-formaldehyde and urea-formaldehyde resins. These partially condensed resins can be prepared easily according to conventional practices. For example, a melamine formaldehyde partial condensate or syrup, which was used in a number of the examples enumerated below, is prepared by refluxing 125 grams of melamine in 184 milliliters of formalin (37 percent by weight formaldehyde) neutralized to a pH of 8 with sodium carbonate. The mole ratio of formaldehyde to melamine in this reaction mixture is 2.3 to 1. The reaction continues for about 1 to 1½ hours at a temperature between 92° and 96°C. or until 1 volume of the condensate becomes turbid when diluted with 2 to 10 volumes of water. A substituted condensation product may be produced by adding a small amount, about 6 to 15 percent by weight, of methanol, an alcohol, e.g. to the condensate.

The resinous condensate or syrup, either with or without methanol, defines an aqueous solution of a partially-condensed, highly cross-linkable resin, said solution being capable of being diluted up to at least twice its volume before any appreciable separation of the resin from its solution occurs.

After separation of the resin from its solution, the condensation reaction continues with time to effect additional cross-linking of the partially condensed materials. This additional condensation or cross-linking may be accelerated by the application of heat and/or the addition of a catalyst, e.g., ammonium chloride, an amine hydrochloride, or the like, to the precipitated particles. Thus, the microcapsules comprising walls of a thermosetting resin material become harder with the passage of time.

The melamine and urea-formaldehyde resins are especially preferred in the present invention.

Optionally, a small amount of a stabilizer is added to the thermosetting resin syrup in order to improve the stability of the resin towards heat, light and oxygen. For example, from about 0.3 to 0.5 percent by weight of a conventional stabilizer such as zinc stearate or dibasic lead stearate may be used.

Any suitable oily material may be employed in the production of the precursor microcapsules of the present invention. As previously mentioned, the oily material in the precursor microcapsules is driven from the microcapsules and is replaced by air. The oily material of the present invention includes lipophilic materials which are preferably liquid, such as oils, which will not mix with water and which can be driven through the porous, solid walls of the present precursor microcapsules. The oily material may be a low melting fat or wax. However, oils are the preferred oily materials, since they do not require special temperature maintenance during the production of the microcapsules.

In general, the lipophilic nucleus materials may be natural or synthetic oils, fats, and waxes or any combination thereof which can be removed from the microcapsules at the desired temperatures. Among the materials that can be employed in the process of the present invention are: aliphatic hydrocarbons, for example, heptane, octane, decane or mixtures of such materials, for example, mineral spirits products and the like.

The preferred oily materials for employment in the present invention are those oils having a fairly high vapor pressure (high volatility), so that they can be completely and easily expelled through the micropores of the solidwalled microcapsules over a wide range of temperatures, e.g., by the application of moderate amounts of heat, e.g., −32° to 180°C., preferably between about 0° to about 100°C. It is especially preferred to employ oils which can be driven from the microcapsules at temperatures conventionally employed in the drying of paper webs or paper coatings, e.g., about 85°C. Preferred oils for use in the present invention include mineral spirits, benzene, xylene, toluene, styrene monomer, turpentine, and oils having a like volatility.

Exceptionally small microcapsules having average diameters ranging from below about two microns and preferably less than about one micron, e.g., between about 0.25 and about 0.8 micron are employed in the present invention. Brisk agitation is required in order to aid in obtaining very small droplets of the emulsion and, ultimately, very small capsules. Agitation may be achieved by means of a high speed mixer of impeller, by ultrasonic waves or by other conventional means.

The dyed or pigmented precursor microcapsules are "activated" by heating to temperatures which cause the oily material to volatilize and pass through the micropores in the solid walls of the microcapsules. The heating of the microcapsules may take place at any time subsequent to their formation. The oily material may be driven from the microcapsules either before or subsequent to their being coated onto a substrate. For example, a dispersion of the oil-containing microcapsules may be spray-dried so as to provide air-containing microcapsules, which may be then coated onto a substrate. Alternatively, the dispersion of oil-containing microcapsules may be subjected to vacuum distillation, steam distillation or a similar process in order to drive the oily core from the microcapsule and replaced the oil with air.

Suitable amoutns of oil-soluble antioxidants, such as 2,6-ditertiary butyl-p-cresol (commercially available from Shell under the tradename, "Ionol"); phenyl-beta-naphthylamine (commercially available from DuPont as "Neozone D"; oil-soluble ultraviolet stabilizers, such as substituted benzotriazole derivatives (commercially available from Geigy Chemical Corp. as "Tinuvin P"), 2,4-dihydroxybenzophenone; 2-hydroxy-4-methoxybenzophenone; 2,2'-dihydroxy-4,4'-dimethoxybenzophenone; substituted acrylonitrile (commercially available as "Uvinul N-35" from GAF); substituted acrylonitrile (commercially available as "Uvinul N-539 from GAF); and the like may be added to the dyed capsules in order to provide additional color stability. However, the employment of such additives is optional.

The following examples illustrate the production and use of the colored, microcapsular pigments of the present invention and constitute the best modes contemplated for carrying out the present invention. The ream of paper as employed in the following examples comprises 500 sheets of 25 inch × 38 inch paper or a total of 3300 square feet of paper. Likewise, the paper employed in the following examples is bond paper (32.5 pounds per ream) having a TAPPI opacity of 73 percent points prior to coating.

EXAMPLE 1

Two hundred grams of mineral spirits are slowly added to 150 grams of a 20 percent by weight starch in a water solution under conditions of slow agitation in a Waring blender in order to emulsify the mineral spirits. The starch is a benzyl substituted, granule starch produced in a manner similar to that described in Example 1 of U.S. Pat. No. 3,462,283.

The high shear agitation conditions are continued for a period of about 10 minutes and this produces an average emulsion droplet size of 0.9 micron.

The emulsion is cooled to room temperature, and the encapsulating agent consisting of 250 grams of an aqueous, B-stage urea-formaldehyde condensate (60 percent by weight solids) are slowly added to the emulsion with continued agitation over a period of 15 minutes in order to induce encapsulation of the oil droplets. The microcapsular suspension of precursor microcapsules is cooled to room temperature and 51 grams of ammonium chloride (10.2 grams on a dry basis) are added to the dispersion.

Next, 0.6 gram of the water-soluble blue dye identified as Azure blue (Compound V in Table 1) is dissolved in 10 milliliters of water and mixed into the microcapsular dispersion. The resulting dispersion is coated onto a cellulose web and the resulting substrate is heated at a temperature of 80°C. for a period of 1 minute following which it is heated at a temperature of 177°C. for 1 minute in orde to remove the mineral spirits from the capsules.

A blue color coating having slightly less intensity as compared with the original emulsion prior to coating is provided.

EXAMPLE 2

The procedure of Example 1 is repeated with the exception that 1.2 grams of the water-soluble green dye, Acid Green (Compound IV of Table 1) is substituted for the 0.6 gram of the blue dye. A green coated paper results having high gloss and a controlled color.

EXAMPLE 3

One hundred grams of a styrene monomer are slowly added to 75 grams of an aqueous solution of starch (15 grams on a dry basis) and 1 gram of benzoyl peroxide.

Ten grams of partially condensed urea-formaldehyde at 60 percent solids is slowly added to the emulsion thereby encapsulating the oily droplets. Next, 2.67 grams of the water-soluble dye, Acid Yellow (Compound III of Table 1) are added to the capsular dispersion. The resulting dye microcapsules have an average particle diameter of one micron. The dyed microcapsules are then coated onto paper and the resulting substrate is dried in an oven of 177°C. for 15 seconds. The resultant coating has a good intensity and water resistance.

EXAMPLE 4

Five grams of an oil-soluble red dye, Sudan Red (Compound VII of Table 1) are dissolved in 100 grams of styrene monomer at room temperature. Next, the styrene is emulsified as before with 200 grams of a (20 percent by weight) hydrophobic starch and 1 gram of benzoyl peroxide. The emulsification is continued for a period of 10 minutes after which it is cooled to room temperature and 100 grams of a B-stage ureaformaldehyde (58 grams on a dry basis) are added in order to encapsulate the styrene solution of red dye. The resulting pigment precursors have an average particle diameter of one micron.

Next, the resulting microcapsules are coated onto paper and dried at 177°C. for 25 seconds. The resultant coating has excellent water resistance and a deep, intense color. The intensity of which increased upon dry.

EXAMPLE 5

Five grams of the oil-soluble red dye of Example 4 are dissolved in 100 grams of soya bean oil which is then emulsified in 200 grams of a hydrophobic starch (20 percent by weight) and emulsified as in the previous Example. Next, 50 grams of urea-formaldehyde (62 percent solids) are added as before and precursor microcapsules are thereby formed.

Next, the capsules are coated onto paper and dried in an oven for 5 minutes at 80°C. and subsequently for 30 minutes at a temperature of 177°C.

EXAMPLE 6

The procedure of Example 4 is repeated with the exception that 100 grams of mineral spirits are emulsified in 200 grams of a hydrophobic starch (20 percent by weight) and partially condensed urea-formaldehyde in an amount of 50 grams of an aqueous dispersion (62 percent solids) are added in order to encapsulate the oily droplets. Five grams of the oil-soluble red dye of Example 4 are provided in the oil prior to emulsification.

The resulting colored microcapsules are coated onto paper and heated for 1 minute at 80°C. and for 30 seconds at 177°C. in order to drive the oil from the capsule.

The intensity and water resistance of the resultant coating is good.

EXAMPLE 7

One hundred grams of styrene monomer having 10 grams of the oil dispersible pigment, carbon black, are emulsified with 370 grams of a 7.5 percent by weight methyl cellulose emulsifier (25 centipoises) solution in water in a Waring blender.

The emulsification is continued until the average particle diameter of the emulsion droplets is about 0.5 micron. Subsequently, 20 grams of an aqueous B-stage urea-formaldehyde condensate (65 percent by weight solids) are slowly added to the emulsion with continued agitation in order to induce encapsulation.

The pigment and oil-containing microcapsules are injected into a spray-dryer chamber. The feed rate is adjusted to about 52 milliliters. The inlet temperature is adjusted to about 150°F. The outlet temperature is recorded at 106°F.

The dry-air-containing, synthetic organic pigments are collected in a collector and are found to contain less than 5 percent mineral spirits. Under microscopic investigation, they are found to be spherical in nature.

The dry capsular product is re-dispersed in water and is coated onto a paper weight to yield an opaque colored coating.

Although the invention has been described in considerable detail with particular reference to certain preferred embodiments thereof, variations and modifications can be effected within the spirit and scope of the invention as described hereinbefore, and as defined in the appended claims. For example, as indicated previously, any suitable method for producing the oil-containing microcapsules may be utilized. Additional processes for producing oil-containing precursor microcapsules are described in U.S. Pat. No. 3,585,149 to Vassiliades which is hereby incorporated by reference.

What is claimed is:

1. Colored, synthetic, organic pigments consisting essentially of discrete, substantially spherical, air-containing microcapsules having an average particle diameter below about two microns, said microcapsules having substantially continuous, organic, polymeric, solid walls having a dye material incorporated therein.

2. The synthetic pigments of claim 1 wherein the dye material is the residue of an oil-soluble dye and is incorporated in the inside surface of the capsular wall.

3. The synthetic pigments of claim 2 wherein the capsular wall comprises a hydrophobic starch.

4. The synthetic pigment of claim 3 wherein said hydrophobic starch is a benzyl-substituted starch.

5. The synthetic pigments of claim 2 wherein the capsular wall comprises either gum arabic, gum tragacanth, agar, gelatin, hydroxyethyl cellulose, methyl cellulose, polyvinyl pyrrolidone or the copolymer of methyl vinyl ether and maleic anhydride.

6. The synthetic pigments of claim 1 wherein said microcapsules have an average particle diameter of between about 0.25 and about 0.8 micron.

7. Colored, synthetic, organic pigments consisting essentially of discrete, substantially spherical, air-containing microcapsules having an average particle diameter below about two microns, said microcapsules having substantially continuous, organic, polymeric, solid walls and containing a non-white oil-dispersible pigment in the microcapsular core.

8. The synthetic pigments of claim 7 wherein said capsular wall comprises a hydrophobic starch.

9. The synthetic pigments of claim 8 wherein said hydrophobic starch is a benzyl-substituted starch.

10. The synthetic pigments of claim 7 wherein said capsular wall comprises either gum arabic, gum tragacanth, agar, gelatin, hydroxyethyl cellulose, methyl cellulose, polyvinyl pyrrolidone or the copolymer of methyl vinyl ether and maleic anhydride.

11. A method for the production of discrete, colored, synthetic pigments which comprises providing substantially spherical, precursor microcapsules having substantially continuous, organic, polymeric, solid walls and an oily core material containing a member selected from the group consisting of non-white oil-dispersible pigments, oil-soluble dyes, and water-soluble dyes, said precursor microcapsules having an average particle diameter below about two microns, and heating said microcapsules to a temperature sufficient to substantially completely drive off said oily core material from said microcapsules in order to provide air-containing, colored pigments.

12. The method of claim 11 wherein said core contains an oil-soluble dye.

13. The method of claim 11 wherein the core of the precursor microcapsules is provided with non-white oil-dispersible pigment.

14. The method of claim 11 wherein said capsular walls comprise a hydrophobic starch.

15. The method of claim 14 wherein said hydrophobic starch is a benzyl-substituted starch.

16. The method of claim 11 wherein said capsular walls comprise either gum arabic, gum tragacanth, agar, gelatin, hydroxyethyl cellulose, methyl cellulose, polyvinyl pyrrolidone or the copolymer of methyl vinyl ether and maleic anhydride.

17. A method for the production of synthetic, organic, colored microcapsular pigments which comprises adding a water-soluble dye to an aqueous dispersion of precursor microcapsules consisting essentially of substantially spherical, microcapsules having substantially continuous, organic, polymeric, solid walls enclosing an oily core material, said microcapsules having an average particle diameter below about two microns, and heating said microcapsules to a temperature sufficient to substantially completely drive off said oily core material from said microcapsules to provide dyed, air-containing microcapsular pigments.

18. The method of claim 17 wherein said capsular walls comprise a hydrophobic starch.

19. The method of claim 18 wherein said hydrophobic starch is a benzyl-substituted starch.

20. The method of claim 17 wherein said capsular walls comprise either gum arabic, gum tragacanth, agar, gelatin, hydroxyethyl cellulose, methyl cellulose, polyvinyl pyrrolidone or the copolymer of methyl vinyl ether and maleic anhydride.

* * * * *